Patented Mar. 31, 1931

1,798,544

UNITED STATES PATENT OFFICE

GEORG KRAENZLEIN AND HEINRICH GREUNE, OF FRANKFORT-ON-THE-MAIN-HOCHST, MAX THIELE, OF FRANKFORT-ON-THE-MAIN, AND KARL HAGER, OF FRANKFORT-ON-THE-MAIN-HOCHST, GERMANY, ASSIGNORS TO GENERAL ANILINE WORKS, INC., OF NEW YORK, N. Y., A CORPORATION OF DELAWARE

PAPER COLORED WITH SULPHONIC-ACID COMPOUNDS OF DYESTUFFS OBTAINABLE FROM HIGHER MOLECULAR DIARYLAMINO-BENZOQUINONES

No Drawing. Application filed May 28, 1929, Serial No. 367,111, and in Germany June 23, 1928.

The present invention relates to paper colored with a salt of a sulphonic acid of a compound of the probable general formula:

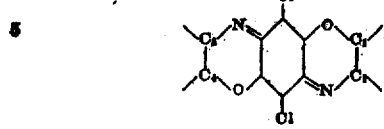

wherein $C_1$ and $C_2$ on the one hand and $C_3$ and $C_4$ on the other hand represent carbon atoms belonging to a naphthalene or carbazol nucleus, or to a benzene nucleus which is substituted by at least one substitutent of the group consisting of $C_6H_5$—O—, $C_6H_5$—NH—, $C_6H_5$—CO—NH—, alkylamino, alkyl and halogen.

The obviously oxazine-like dyestuffs obtainable by heating diarylamino-benzoquinones in the presence of a high-boiling solvent have hitherto not reached as sulphonic acids any practical importance for dyeing wool and silk; this is chiefly due to the fact that these dyestuffs which yield for the most part red, reddish-brown or violet shades are inferior to commercial products dyeing the same tints particularly as regards their levelling power.

We have found that the sulphonic acids of the compounds represented by the above indicated general formula are very valuable dyestuffs for coloring paper.

The said compounds are obtainable, for instance, according to the copending U. S. patent application Ser. No. 364,316, filed May 18, 1929, from higher molecular diarylamino-benzoquinone compounds which may be represented by the following general formula:

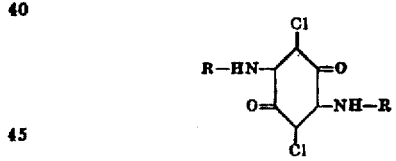

wherein R means a naphthalene or carbazol nucleus or a benzene nucleus which is substituted by at least one substituent of the group consisting of $C_6H_5$—O—, $C_6H_5$—NH—, $C_6H_5$—CO.NH—, alkylamino, alkyl and halogen, said nucleus R having at least one free ortho-position in relation to the —NH— group.

These higher molecular diarylamino-benzoquinone compounds may be prepared by condensing chloranil with an amino compound of the general formula:

$$H_2N—R$$

wherein R has the above indicated meaning and wherein there is at least one free ortho-position in relation to the $NH_2$ group.

When coloring the paper both in the mass and according to the diving process beautiful uniform colorations are obtained being of a very good fastness to water and light so that these sulphonated, probably oxazine-like condensation products obtainable from the said higher molecular diarylamino-benzoquinone compounds constitute a valuable separate class of dyestuffs for coloring paper.

The following examples serve to illustrate our invention but they are not intended to limit it thereto, the parts being by weight.

1. 100 parts of paper pulp which have been beaten in a hollander are diluted with water and mixed with a solution of 1 part of the sodium salt of the dyestuff-sulphonic acid of the following formula:

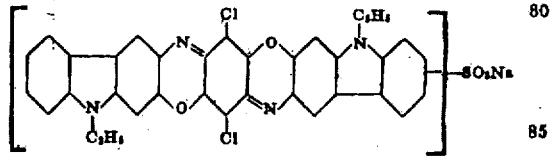

prepared according to Example 1 of the copending U. S. patent application above referred to from 2.5-di-(N-ethylcarbazolyl-3'-amino-)-3.6-dichloro-1.4-benzoquinone; the paper mass is then sized in the usual manner with resin soap and sulfate of alumina or alum. In this manner a beautiful uniform blue coloration of the paper of 1 per cent is obtained being of a very good fastness to water and light.

2. 100 parts of the paper pulp which have been beaten in a hollander are diluted with water, mixed with a solution of 1 part of the sodium salt of the sulphonated benzo-quinone derivative of the following probable formula:

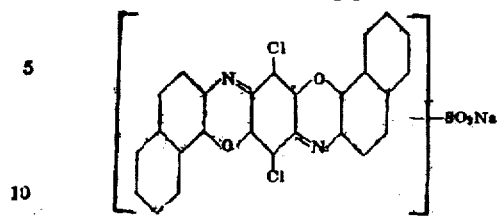

prepared by heating di-(beta-naphthylamino)-dichloro-benzoquinone in nitrobenzene, and then sized in the usual manner with resin soap and sulfate of alumina or alum. By this operation there is obtained a beautiful uniform violet coloration of 1 per cent being of a very good fastness to water and light.

3. By mixing 100 parts of paper pulp which have been beaten in a hollander and diluted by means of water with a solution of 1 part of the sodium salt of the sulphonated oxazine-like product of the following probable formula:

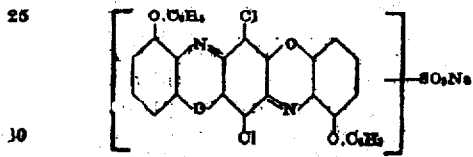

prepared by treating 2,5-di-(—ortho-amino-diphenyloxide)-3,6-dichloro-1,4-benzoquinone with nitrobenzene and phosphorus pentachloride, and sizing the paper in the usual manner with resin soap and sulfate of alumina or alum, a beautiful uniform red coloration of 1 per cent is obtained, being of a very good fastness to water and light.

4. 100 parts of paper pulp which have been beaten in a hollander and diluted with water are mixed with a solution of 1 part of the sulphonated oxazine-like product of the following probable formula:

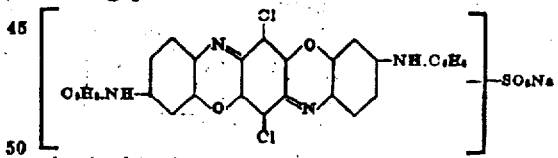

obtainable by treating 2,5-di-(para-amino-diphenylamine)-3,6-dichloro-1,4-benzoquinone with nitrobenzene, and sized in the usual manner with resin soap and sulfate of alumina. By this method a bluish-gray coloration is obtained being of a good fastness to light.

Instead of the para-amino-diphenylamine there may also be used the oxazine-like dyestuff-sulphonic acids which are obtainable from chloroanil by treating it with 4-amino-4'-methoxy-diphenylamine, para-amino-dimethylaniline, para-toluidine or para-chloraniline. The oxazine-like dyestuff-sulphonic acids which are obtainable from chloroanil by treating it with 1-benzoyl-amino-3-aminobenzene or 4-benzoyl-amino-4'-amino-diphenylamine also color the paper beautiful tints of good fastness to water and light.

Equal beautiful colorations of the paper of the same fastness to water and light are obtained by passing according to the diving process the final unsized paper in known manner through a solution of the dyestuffs mentioned in the preceding examples.

In the above given examples and in the claims hereafter following we have given certain chemical formulæ for the dyestuffs to be used according to our invention. However, we want it to be understood that the chemical reactions involved in the process of preparing the dyestuffs in question are not quite clear. According to our present knowledge the formulæ of the dyestuffs as given herein correspond with their chemical properties so that they may serve as a proper designation of the dyestuffs in question.

We claim:

1. Paper colored with a salt of a sulphonic acid of a compound of the probable general formula:

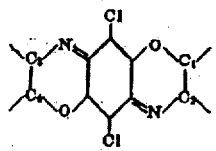

wherein $C_1$ and $C_2$ on the one hand and $C_3$ and $C_4$ on the other hand represent carbon atoms belonging to a naphthalene or a carbazol nucleus, or to a benzene nucleus which is substituted by at least one substituent of the group consisting of $C_6H_5$—O—, $C_6H_5$—NH—, $C_6H_5$—CO—NH—, alkyl-amino, alkyl and halogen.

2. Paper colored with the sodium salt of the sulphonic acid compound of the following probable formula:

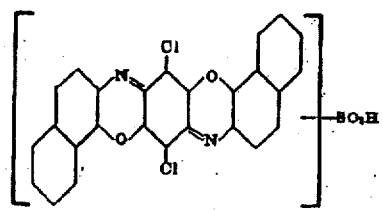

having a uniform violet coloration of good fastness to water and light.

3. Paper colored with the sodium salt of the sulphonic acid compound of the following probable formula:

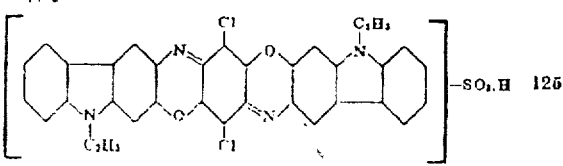

having a uniform blue coloration of good fastness to water and light.

4. Paper colored with the sodium salt of the sulphonic acid compound of the following probable formula:
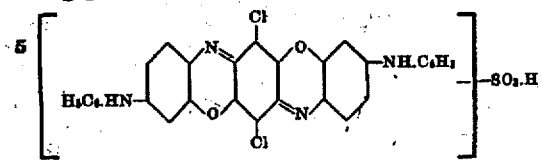
having a bluish-gray coloration of good fastness to light.
In testimony whereof, we affix our signatures.
GEORG KRAENZLEIN.
HEINRICH GREUNE.
MAX THIELE.
KARL HAGER.

4. Paper colored with the sodium salt of the sulphonic acid compound of the following probable formula:

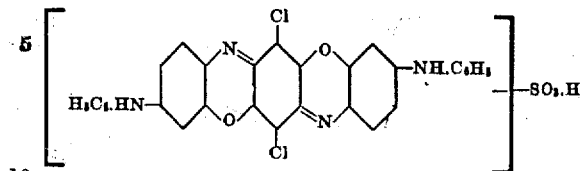

having a bluish-gray coloration of good fastness to light.

In testimony whereof, we affix our signatures.

GEORG KRAENZLEIN.
HEINRICH GREUNE.
MAX THIELE.
KARL HAGER.

Certificate of Correction

Patent No. 1,798,544.      Granted March 31, 1931, to

GEORG KRAENZLEIN ET AL.

It is hereby certified that error appears in the printed specification of the above-numbered patent requiring correction as follows: Page 2, line 5, formula, for the group of characters on the extreme right, for "$SO_2Na$" read $SO_3Na$; same page, line 25, formula, for the group of characters at lower right within the bracket for "$O.C_6H_3$" read $O.C_6H_5$; and that the said Letters Patent should be read with these corrections therein that the same may conform to the record of the case in the Patent Office.

Signed and sealed this 5th day of May, A. D. 1931.

[SEAL.]

M. J. MOORE,
*Acting Commissioner of Patents.*

Certificate of Correction

Patent No. 1,798,544.                                              Granted March 31, 1931, to

GEORG KRAENZLEIN ET AL.

It is hereby certified that error appears in the printed specification of the above-numbered patent requiring correction as follows: Page 2, line 5, formula, for the group of characters on the extreme right, for "$SO_2Na$" read $SO_3Na$; same page, line 25, formula, for the group of characters at lower right within the bracket, for "$O.C_6H_4$" read $O.C_6H_5$; and that the said Letters Patent should be read with these corrections therein that the same may conform to the record of the case in the Patent Office.

Signed and sealed this 5th day of May, A. D. 1931.

[SEAL.]

M. J. MOORE,
*Acting Commissioner of Patents.*